United States Patent
Nies et al.

(10) Patent No.: US 10,740,712 B2
(45) Date of Patent: Aug. 11, 2020

(54) USE OF ANALYTICS METHODS FOR PERSONALIZED GUIDANCE

(71) Applicant: Verint Americas Inc., Melville, NY (US)

(72) Inventors: James G. Nies, Carmel, IN (US);
Joseph Watson, Alpharetta, GA (US);
Oren Stern, Alpharetta, GA (US);
Martin McCreesh, Dunleer (IE)

(73) Assignee: Verint Americas Inc., Alpharetta, GA (US)

( * ) Notice: Subject to any disclaimer, the term of this patent is extended or adjusted under 35 U.S.C. 154(b) by 569 days.

(21) Appl. No.: 14/083,783

(22) Filed: Nov. 19, 2013

(65) Prior Publication Data
US 2014/0143026 A1    May 22, 2014

Related U.S. Application Data

(60) Provisional application No. 61/729,073, filed on Nov. 21, 2012.

(51) Int. Cl.
*G06Q 10/06* (2012.01)

(52) U.S. Cl.
CPC ............... *G06Q 10/06398* (2013.01)

(58) Field of Classification Search
CPC ................................ G06Q 10/06398
USPC .................................. 705/7.42
See application file for complete search history.

(56) References Cited

U.S. PATENT DOCUMENTS

| | | | | |
|---|---|---|---|---|
| 5,138,377 A * | 8/1992 | Smith | ............... | G03G 15/55 399/11 |
| 6,567,787 B1 * | 5/2003 | Walker | ............ | G06Q 10/06398 704/273 |
| 6,629,087 B1 * | 9/2003 | Benson | ............ | G06F 17/24 704/2 |
| 6,970,821 B1 * | 11/2005 | Shambaugh | ......... | G06F 40/289 704/270 |
| 7,783,513 B2 * | 8/2010 | Lee | ............. | G06Q 10/06398 705/7.42 |

(Continued)

OTHER PUBLICATIONS

Security software and service companies; frost bank to implement impact 360 for retail financial services solution from verint. (Feb. 3, 2011). Computers, Networks & Communications Retrieved from http://dialog.proquest.com/professional/docview/847381782?accountid=131444 (Year: 2011).*

(Continued)

*Primary Examiner* — Folashade Anderson
(74) *Attorney, Agent, or Firm* — Christopher M. Scherer; DeWitt LLP

(57) ABSTRACT

Systems and methods of automated personalized guidance include the evaluation of interaction content data. At least one automated guidance is assigned to an agent based upon the evaluation. The automated guidance is defined by at least one interaction type and at least one guidance trigger. Interaction content data is monitored to identify instances of the interaction type and the guidance trigger. Upon identification of the interaction type and the guidance trigger, the automated guidance is automatedly provided. The automated guidance is then evaluated based upon the interaction content data.

18 Claims, 3 Drawing Sheets

(56) References Cited

U.S. PATENT DOCUMENTS

| | | | | |
|---|---|---|---|---|
| 8,180,643 B1* | 5/2012 | Pettay | ................... | G10L 15/26 704/231 |
| 8,219,401 B1* | 7/2012 | Pettay | ................... | G10L 15/26 704/270 |
| 8,706,498 B2* | 4/2014 | George | ............... | H04M 3/4936 379/265.01 |
| 9,392,114 B1* | 7/2016 | Bobowski | ........... | H04M 3/5175 |
| 9,544,438 B1* | 1/2017 | Andraszek | .............. | G10L 21/06 |
| 2002/0069101 A1* | 6/2002 | Vincent | ................ | G06Q 30/02 705/14.53 |
| 2006/0282530 A1* | 12/2006 | Klein | ...................... | H04L 67/20 709/224 |
| 2008/0263195 A1* | 10/2008 | Kroll | .................. | G06F 11/3409 709/224 |
| 2010/0138282 A1* | 6/2010 | Kannan | ................. | G06Q 30/02 705/7.42 |
| 2014/0164317 A1* | 6/2014 | Lynch | .................... | G06Q 10/02 707/609 |
| 2015/0319307 A1* | 11/2015 | Govindarajan | ....... | H04M 3/523 379/265.02 |
| 2015/0348151 A1* | 12/2015 | Francis | .............. | G06Q 30/0611 705/26.4 |
| 2015/0356780 A1* | 12/2015 | Madegowda | ............ | G09B 5/14 345/633 |
| 2016/0133256 A1* | 5/2016 | Lembersky | ............. | G10L 15/26 704/235 |
| 2016/0260045 A1* | 9/2016 | Morin | .............. | G06Q 10/06398 |
| 2016/0260166 A1* | 9/2016 | Camillo | ................. | G06Q 40/00 |
| 2017/0228220 A1* | 8/2017 | Dai | ....................... | G06F 11/362 |

OTHER PUBLICATIONS

Leading international insurance organization furthers investment in verint solutions with implementation of impact 360 for back-office operations. (Sep. 23, 2013). Business Wire Retrieved from http://dialog.proquest.com/professional/docview/1434820546?accountid=131444 (Year: 2013).*

* cited by examiner

USE OF ANALYTICS METHODS FOR PERSONALIZED GUIDANCE

CROSS-REFERENCE TO RELATED APPLICATION

The present application claims priority of U.S. Provisional Patent Application No. 61/729,073, filed on Nov. 21, 2012, the content of which is hereby incorporated herein by reference in its entirety.

BACKGROUND

The present disclosure is related to the field of analytics. More specifically, analytics are used to identify, provide, and evaluate personalized guidance in a monitored setting.

Current real-time agent assistant applications are driven by predefined scenarios and static rules that are triggered by desktop and/or speech events together with historical data to suggest a course of action or show some type of guidance to an agent.

Off-line training and coaching solutions are time intensive, and by their very nature, must be generalized to the experience of an average agent or commonly encountered issues. Still even with current assistance, training, and coaching techniques, agents may experience individual lapses in quality, or agents may be slow to adopt new or changing interaction instructions. In still further instances, increased segmentation and granularization of responses or expectations for interactions with specific individuals can create a multitude of responses or procedures which can be difficult for even experienced agents to remember and effectively carry out.

Therefore, as disclosed herein, by using an in-depth understanding of how activities are carried out, guidance for individuals, groups, or specific activities can be automatedly added or removed.

BRIEF DISCLOSURE

Embodiments of a method of automated personalized guidance include evaluating interaction content data. At least one automated guidance is assigned. The automated guidance is defined by at least one interaction type in at least one guidance trigger. Interaction content data is monitored for instances of the interaction type and the guidance trigger. The automated guidance is automatedly provided. The assigned at least one automated guidance is evaluated based upon interactions in which the automated guidance was provided.

In a further exemplary embodiment of a method of automated personalized guidance for customer service agents includes evaluating historical interaction content data acquired from customer service interactions of a customer service agent. At least one guidance is assigned based upon the evaluation. The guidance is defined by at least one interaction type and at least one guidance trigger. Interaction content data of a customer service interaction is monitored to identify instances of the at least one interaction type and the at least one guidance trigger. Upon identifying the at least one interaction type and at least one guidance trigger in the monitored interaction content data, the guidance is automatedly provided at a workstation of the customer service agent. The assigned guidance is evaluated based upon the monitored interaction content data of the customer service interaction.

A system for automated guidance for an agent includes a computer readable medium upon which interaction content data is stored. A plurality of guidance are stored on a computer readable medium. Each guidance is associated to a performance standard and an interaction type. Each guidance is further defined by at least one guidance trigger. A plurality of the performance standards are stored on a computer readable medium. A processor is communicatively connected to the computer readable medium upon which the interaction content data, guidance, and performance standards are stored. The processor compares interaction content data to the performance standards and assigns at least one guidance to the agent. The processor receives a real-time stream of interaction data. The processor identifies at least one interaction type of the interaction data. The processor compares the at least one guidance trigger of the assigned guidance associated to the identified at least one interaction type. The processor initiates a presentation of the guidance upon identification of the at least one guidance trigger in the real time stream of interaction data. A computer work station that includes a graphical display is operated by the processor to automatedly present the guidance.

DETAILED DISCLOSURE

Figure 1:
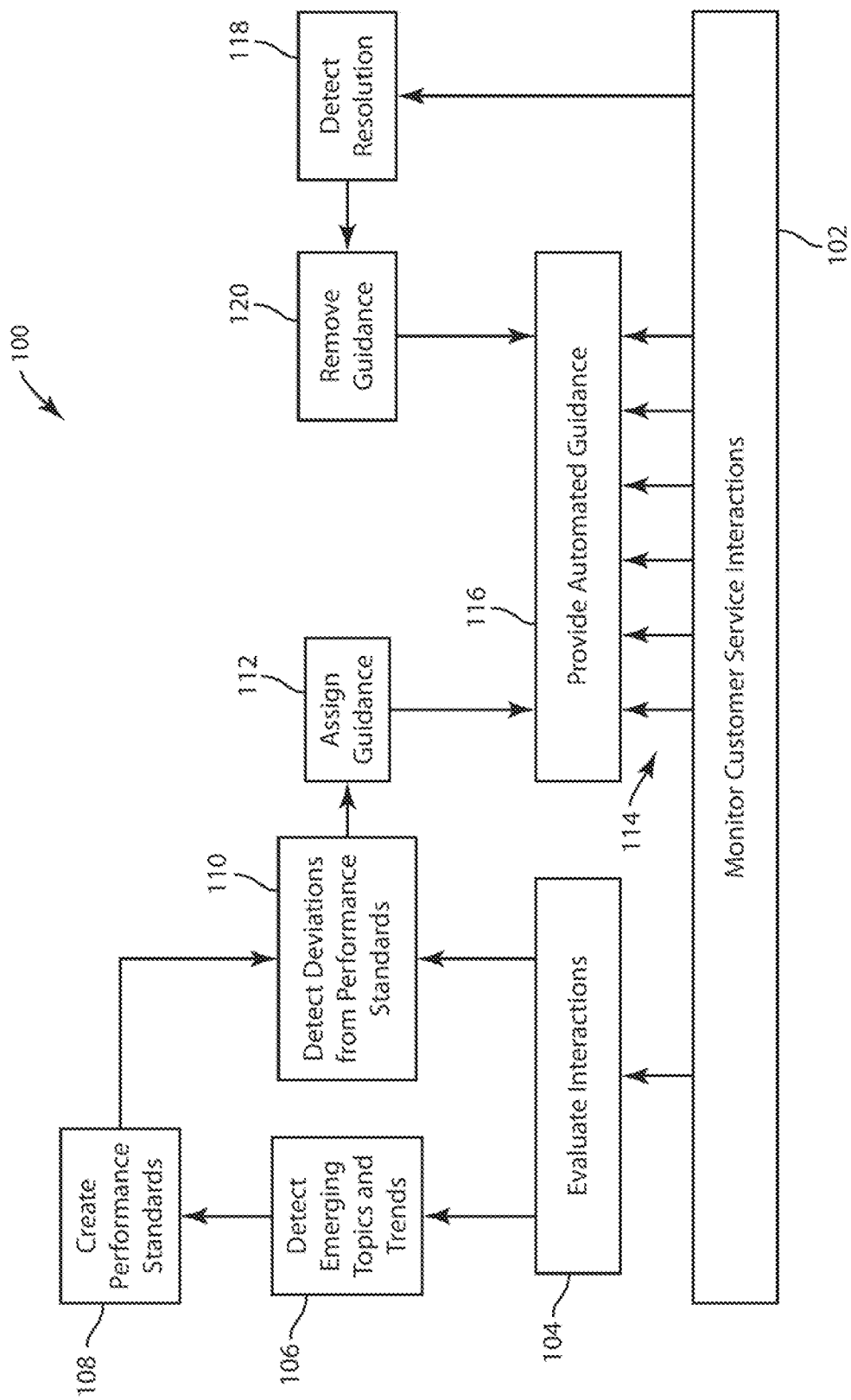
FIG. 1 is a flowchart that depicts an exemplary embodiment of a method of personalized guidance.

In general, the systems and processes as disclosed herein monitor customer service interactions and other transactions by applying speech analytics, text analytics, desktop or workspace analytics, and/or customer feedback surveys from specific customer service interactions to create metrics that describe each employee's performance, behavior, or knowledge issues and their impact on customer service. In embodiments, this analysis can further be used to automatedly identify best and worst practices among employees in order to achieve specific customer service outcomes. Similarly, other embodiments can partially or fully automate the assignment, monitoring, evaluation, and removal of various types of guidance.

Embodiments of the systems and methods disclosed herein assign individuals, or groups of individuals, to receive one or more various types of guidance. The assigned guidance may include real-time guidance to facilitate improvements in the execution of customer service interactions and other transactions or activities. The assigned guidance seeks to resolve customer service issues such as deviations from performance standards or identification of an emerging issue, that may be detected through monitoring customer service interactions or other transactions or activities (collectively customer service interactions). Once the guidance is assigned to the employees or groups of employees, the future customer service interactions are monitored to detect when one or more of the assigned guidance packages is applicable and/or timely in the customer service interaction. Embodiments of the system and method then provide the assigned guidance at the appropriate time during the customer service interaction. Such guidance can be in the form of on screen messages, prompts, reminders, and/or application automations.

Embodiments of the systems and methods then measure the employee's execution of the guidance and the employee's activities relating to the assigned guidance. When the system detects that the originally identified deviations from performance standards, or detected emerging issues have been resolved in the customer service interactions, then the assigned automated guidance is removed.

In embodiments, systems and applications collect and analyze an organization's interactions with customers across channels and business units and then use those insights to optimize their businesses. The systems and methods as disclosed herein leverage this information for improved customer service agent evaluation. Still further embodiments can relate back to other areas of business including, but not limited to, sales and marketing, product management, or human resources where policies, processes, products, or services impact the customer experience.

In the exemplary embodiment of customer service contact center, the contact centers address individual interaction quality at a strategic level, for example, by developing agent scripts, by providing coaching and training, and by analyzing calls to see where agents need to improve, and then implementing that information into the call center operations. Organizations can create responses to identify the issues and attempt to embed connections in their operational processes; however, customer service agent training alone cannot be depended upon to ensure the desired customer interaction results. Customer service agents need the right guidance at the right time in the customer interaction. Embodiments of the systems and methods as disclosed herein use analytic tools like speech analytics, text analytics, desktop process analytics, and customer survey analysis to identify root causes of customer service issues. Once a customer service issue is discovered, automated guidance can be developed to deliver personalized guidance to the agents that require it. This guidance can take a variety of forms, including a pop-up message on a computer workstation display, automated population of data into data fields in computer programs or screens or inter or intra office emails or other communications.

After a customer service interaction is over, the interaction can be analyzed individually or in the aggregate in order to evaluate the guidance provided to the customer service agents in order to further improve processes, services, scripts, sales, or other identified issues.

Root causes or customer service issues to be addressed through customer service agent guidance can be identified for issues such as reducing customer repeat calls, improving customer satisfaction, increasing cross sales or up sales, ensuring compliance in specific customer transactions such as orders or returns, and reduce customer service call time. Alternatively, specific customer service or other employees can be targeted with increased guidance in order to remind agents of the issues that are important to particular customers or to provide additional assistance to low performing or newly hired customer service agents.

Specific types of guidance can be triggered upon various events that are detected during a customer service interaction. These triggers may include what the customer is saying, what the customer service agent says, or the actions taken by the customer service agent in the agent's workstation. As one example, during a customer service interaction, the customer may refer to a specific life event, such as a relocation. This may trigger guidance to the customer service agent such as to remind a customer service agent to inquire about an insurance review for a new property. Alternatively, this may trigger another application, such as a change of address application, to launch and prepopulate the application with appropriate customer data.

Figure 2:
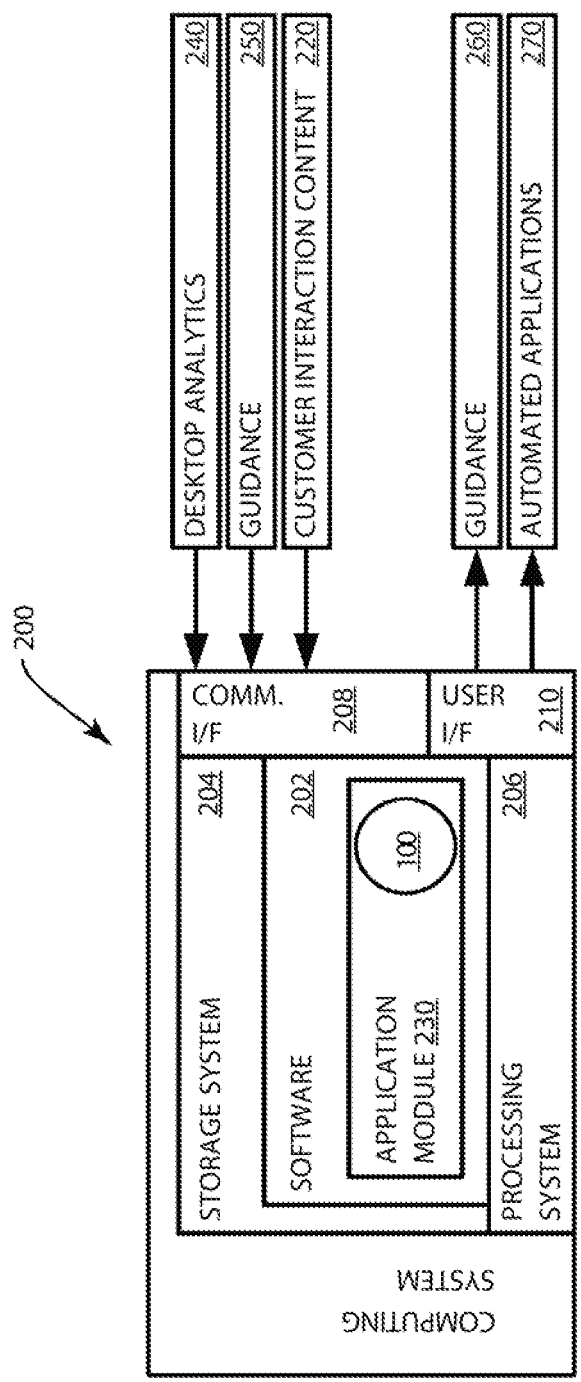
FIG. 2 is a system diagram of an exemplary embodiment of a system for personalized guidance.
Figure 3:
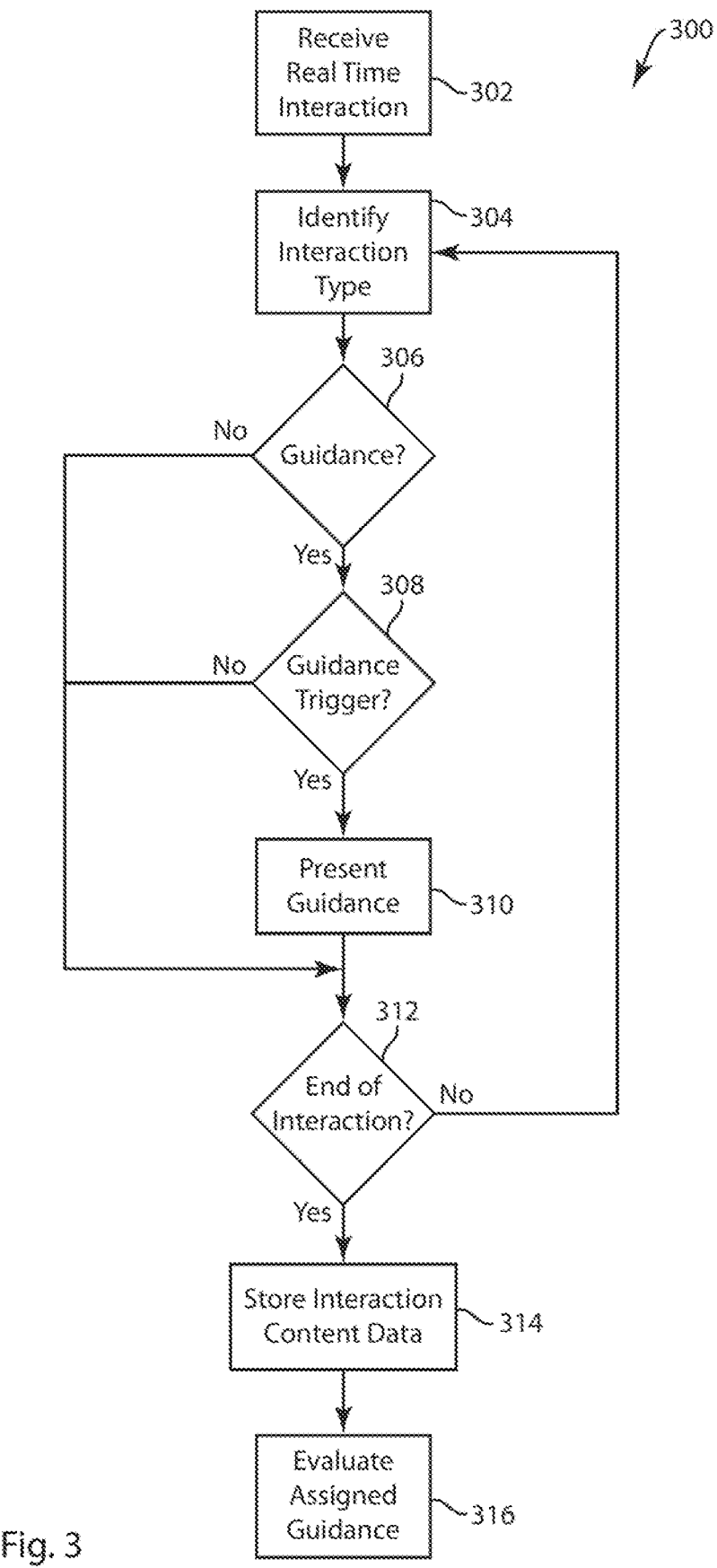
FIG. 3 is a flow chart that depicts an alternative exemplary embodiment of a method of personalized guidance.

FIGS. 1 and 3 are flow charts that depict exemplary embodiments of methods of using personalized guidance. FIG. 2 is a system diagram of an exemplary embodiment of a system 200 which may be used to automatedly create, use, and evaluate personalized guidance in the manner as described herein with respect to the embodiments depicted in FIGS. 1 and 3. The system 200 is generally a computing system that includes a processing system 206, storage system 204, software 202, communication interface 208, and a user interface 210. The processing system 206 loads and executes software 202 from the storage system 204, including a software module 230. When executed by the computing system 200, software module 230 directs the processing system 206 to operate as described herein, in further detail in accordance with the methods 100 and 300 respectively depicted in FIGS. 1 and 3.

Although the computing system 200 depicted in FIG. 2 includes one software module in the present example, it should be understood that one or more modules could provide the same operation. Similarly, while a description as provided herein refers to a computing system 200 and a processing system 206, it is to be recognized that implementations of such systems can be performed using one or more processors, which may be communicatively connected and such implementations are considered to be within the scope of the description.

The processing system 206 can include a microprocessor and other circuitry that retrieves and executes software 200 from storage system 204. Processing system 206 can be implanted within a single processing device, but can also be distributed across multiple processing devices or sub-systems that cooperate in executing program instructions. Examples of processing system 206 include general purpose central processing units, application specific processors, and logic devices, as well as any other types of processing devices, combinations of processing devices, or variations thereof.

The storage system 24 can include any storage media readable by a processing system 206, and capable of storing software 202. The storage system 204 can include volatile and non-volatile, removable and non-removable media implemented in any method of technology for storage of information, such as computer readable instructions, data structures, program modules, or other data. Storage system 204 can be implemented as a single storage device but may also be implemented across multiple storage devices or sub-systems. Storage system 204 can further include additional elements, such as a controller, capable of communicating with the processing system 206.

Examples of storage media include random access memory read-only memory, magnetic discs, optical discs, flash memory discs, virtual and non-virtual memory, magnetic sets, magnetic tape, magnetic disc storage or other magnetic storage device, or any other medium which can be used to store the desired information and that may be accessed by an instruction execution system, as well as any combination or variation thereof or any other type of storage media. In some implementations, the storage media can be a non-transitory storage media.

User interface 210 can include a mouse, a keyboard, a voice input device, a touch input device for receiving a gesture from a user, motion input device for detecting non-touch gestures and other motions by a user, and other comparable input devices and associated processing elements capable of receiving user input from a user. Output devices such as a video display or a graphical display and display an interface further associated with embodiments of the system and method as disclosed herein. Speakers, printers, haptic devices, and other types of output devices may also be included in the user interface 210.

As described in further detail herein, the computing system 200 receives customer interaction content 220. In exemplary embodiments, the customer interaction content 220 may include any of a variety of customer interactions and resulting data files including, but not limited to audio recording of customer service interactions, interactive voice recorder (IVR) responses, web chat transcripts, e-mail, text or other SMS messages, social media, website interactions, and web or mobile survey responses. In one exemplary embodiment, the customer interaction content 220 includes previously recorded and stored or streaming real-time audio data of a customer service interaction exemplary between a customer service agent and a customer. In embodiments, the processor 200 may operate to transform or partially transform the received customer interaction content 220 into a text form for further processing through rules and analytics which may be stored as part of the application module 230.

In addition to the customer interaction content 220, the processing system 206 may further receive desktop or workspace analytics 240 regarding one or more customer service agents. The desktop or workspace analytics may include a time stamped log of functions, applications and inputs made to a customer service agent's workstation, while in further embodiments may include video data of the customer service agent at the agent's work station. At 250, a database of available guidance may be accessed as disclosed herein in order to retrieve one or more types of guidance for identified agents or groups of agents to receive as described in further detail herein. In an exemplary embodiment, the computing system 200 may output the selected guidance at 260 the output guidance may exemplarily take the form of a pop up message on a graphical display of the agent's workstation; however, this is not intended to be limiting on the scope of the guidance 260 that may be provided in accordance with the disclosure herein. In still further embodiments, the user interface 210 may operate to automatedly open and/or populate an application at 270 as guidance or a prompt to an agent of desired workflow process next step and/or to promote process accuracy. In non-limiting embodiments as described herein, the application may be an e-mail or a particular request form such as a service request.

FIG. 1 is a flow chart that depicts an embodiment of a method 100 of using analytics to provide personalized guidance to customer service agents or other employees. From the descriptions herein, and examples given, it will be recognized that embodiments of the flow chart of FIG. 1 can be carried out on a computer, or across a plurality of networked computers operating in various data processing, serving, and user workstation capacities as described above with respect to FIG. 2 to carry out the process as disclosed herein.

In the method 100 new customer service interactions are monitored at 102. In exemplary embodiments, the monitored customer service interactions may include a plurality of customer service interactions provided as customer interaction content while in still further embodiments, the customer interactions may solely be within a single channel, exemplarily phone calls or web chats. While in some embodiments as disclosed herein, the monitoring of customer service interactions may be an ongoing process of all customer services interactions, or a representative sample (e.g. every other interaction, every fifth interaction, or every tenth interaction; however, these are in no way intended to be limiting). The monitoring of customer service interactions at 102 may include a variety of motioning techniques such as speech analytics or textual analytics of telephone calls in between customers and a customer service agent.

The customer interaction content can further include a wide variety of channels of data. These channels can include audio or textual transcripts of phone calls or web data, but can also include more discretely occurring events such as social media posts, purchases, returns, warranty claims, or survey responses. These may be aggregated along with information identifying the customer such as demographic information and may be associated to as customer identification number or an account number.

At 104, the monitored customer service interactions are evaluated along with an analysis of other customer interaction content. This analysis can include the identification of categories, trends, themes, and customer behavior indicators from the analysis of interaction audio, email, or other text sources. Customer feedback can be evaluated using customer surveys to identify customer feedback regarding specific business objectives, performance goals, or point of emphasis in evaluating the effectiveness of a customer service agent. Customer feedback can further help to identify specific types of customer service interactions, or specific customer attributes that are correlated to customer service issues through survey question responses. Desktop analytics can further produce information regarding a customer service agent's use of desktop applications to specifically identify points or landmarks in the customer interaction and the agent's effectiveness in the use of available desktop tools or applications. Still further embodiments may include acquisition and evaluation of video of a customer service agent's work environment and other employee performance data that may be captured by an employer.

The evaluation and analysis at 104 may lead to the identification of detection of new or emerging topics or trends in the customer interaction content at 106. The detection of emerging topics or trends may help to identify new customer service areas for which performing standards are created at 108. In an alternative to simply detecting new topics for the analysis, when identifying all topics and trends in the customer service interaction content detected changes in topic or issue frequency may result in adjustments to priorities of topics by a business. In a merely exemplary embodiment, after the introduction of a new product, specific warranty claims or customer dissatisfaction with features of the product may emerge as frequent issues. By the comparison of customer service interactions that were with respect to the same issues but resulted in a positive outcome as compared to those customer service interactions that resulted in negative outcomes, preferred customer service techniques, phrases, or other best practices (e.g. follow-up e-mails, prompt warranty processing, or promotional offers, etc.) may result in identification of a new performance standard at 108.

At 110 the monitored customer service interactions and the interaction content for a particular agent or a group of agents, as will be described in further detail herein, is evaluated at 104, the performance standards, including any newly created performance standards created at 108, as well as those that maybe predefined by a business or organization, are compared to the evaluated interaction content in order to detect deviations from the performance standards. In a non-limiting embodiment it may be identified that a customer service agent does not accurately follow the script that the customer service agent is supposed to follow when a customer inquiries regarding a service upgrade. This may be detected as a deviation at 110 from the performance standard of reading the script with at least 95% accuracy. In response, guidance may be assigned at 112. Embodiments of the guidance assigned at 112 may include both general and employee specific guidance, and may also include real-time guidance or off-line guidance.

General guidance is assigned to a wide group of personnel, exemplarily based upon location or experience or an event such as a new product introduction, a new company initiative or a competitor's new promotion or marketing. As these may represent brand new or newly detected issues, all customer service agents may be in need of guidance until they can become familiar with the new issues.

Individualized employee specific guidance can be assigned to an individual if it is determined that that individual is not meeting some type of predetermined individual performance standard. The guidance that is assigned may further come in one of two general forms, specifically real-time guidance or off-line guidance. Off-line guidance may be an instruction to the employee or group of employees to undergo training, certification, review training materials, or receive coaching. Real-time guidance as disclosed in further detail herein, uses speech or text analytics to first identify a topic or type of customer service interaction and then to search for guidance triggers as the interaction progresses. Upon identifying a guidance trigger in the customer service interaction, the guidance is presented to the customer service agent, exemplarily as a pop out message on a graphical display of the agent's workstation. Taken together, each customer service agent may have a personalized combination of assigned general guidance and individual employee specific guidance at any one time, and it is expected that the assigned combination of guidance will change overtime.

After the guidance is assigned at 112, new customer service interactions 114 are monitored exemplarily in the manner as described above with respect to the monitoring of customer service interactions at 102. As each of the subsequent customer service interactions takes place, rules and/or triggers in how automated guidance is provided to the customer service agent are applied to the ongoing customer service interaction.

In exemplary embodiments, the guidance triggers are identified words, topics, or events in the ongoing customer service interaction. The guidance triggers may be exemplarily defined by Boolean statements or fuzzy logic that may combine multiple concepts into a single trigger. These concepts can extend cross channel. In embodiments, a trigger may include a particular topic or word in the customer service interaction along with a specified desktop action by the agent. In an alternative embodiment, a customer is identified and guidance may be triggered wholly or in part based upon customer demographics or rewards status, purchase history, social media interactions, or emails in addition to identified topics or words in the customer service interaction.

When the criteria or rules of the guidance triggers are met at 116, then the automated guidance is provided to the customer service agent. Exemplary embodiments of the provision of such automated guidance will be described in further detail herein; however, two examples of automated guidance includes pop up reminders, notifications, or script portions, and automated opening and/or prepopulating of applications or forms with customer service interaction data.

This process of providing automated guidance during new customer service interactions continues and the performance of the customer service agent is evaluated at regular intervals, exemplarily as described above with respect to 104. If the customer service agent corrects the deviations from the performance, then the resolution of the identified problem is detected at 118 which may result in the removal of the assigned guidance at 120. Once the guidance is removed, the guidance may be no longer automatedly provided during customer service interactions. However, as previously described, customer service interactions will continue to be monitored and evaluated as described above in order to determine if new guidance needs to be assigned.

FIG. 3 is a flowchart that depicts an exemplary embodiment of a method 300 of providing automated guidance in real-time. At 302, the real-time customer service interaction data is received. In exemplary embodiments used herein, the real time interaction is a telephonic call between a customer service agent and a customer; however, it is to be understood that the real-time interactions may be a variety of interactions between people and may include, but are not limited to web chats. Additionally, the real-time interaction data may be received in addition to other discrete event sources of interaction data such as social media, emails, purchases, returns, etc. As part of receiving the real-time interaction at 302, the received interaction data may be processed in a manner to place it is a suitable form for the rest of the analysis described herein. In some exemplary embodiments, streaming audio data may be processed with speech analytic techniques based upon acoustical analysis while in other embodiments, streaming audio may be automatedly transcribed and textual analytic techniques used in the analysis described herein.

At 304 the speech or textual analytics first identify an interaction type. Over the course of any time period comprised of a series of sequential customer service interactions, the specific type or subject of the interaction may change interaction to interaction or a customer service agent may receive a string of the same type of interaction. Therefore, by identification of the type of interaction or the subject of the interaction, subsequent analysis can be narrowed to promote efficiency of implementation of the method. Exemplary embodiments of interaction types may be purchases, returns, troubleshooting/product complaints, cancellation of services, and/or warranty claims; however, these are not intended to be limiting on the interaction types that may be identified.

At 306 a determination is made whether or not guidance has been assigned to this customer service agent with respect to the identified interaction type. As described above, the guidance may have been generally assigned to a broad class of customer service agents, exemplarily by subject matter, experience, an external event, general office performance, or some other criteria. Additionally, a customer service agent may have been identified to receive further guidance based upon various identified areas for improvement. It will be recognized that some guidance may be applicable to a plurality of interaction types or all interaction types. If no guidance has been assigned to the customer service agent for the identified interaction type, then the method skips to later steps. If guidance has been assigned to the customer service agent for the identified interaction type, then one or more guidance triggers are used to analyze the real-time customer service interaction ongoing between the customer service agent and the customer at 308.

In alternative embodiments, other workflows may be used to apply the guidance triggers at 308. In one exemplary embodiment, no interaction type is identified and any guidance assigned to the agent is applied to the real-time interaction data. In another non-limiting embodiment, all of the available guidance is applied to the real-time interaction data to identify guidance triggers at 308.

As described above, the guidance triggers at 308 may be one or more of statements made by a customer or the agent, or actions taken by the agent through the agents workstation, exemplarily a desktop computer. While these will be described in greater detail herein through examples, such guidance triggers may be the comparison of the customer service agent's speech to a predetermined script, and if the agent deviates from the scripts this may trigger guidance. Alternatively, the opening of an application in the customer service agents work station may further trigger guidance with respect to the use of that application or an identification that the wrong application has been opened. Similarly, customer statements, such as "return", "warranty", "upgrade", or "cancel" may trigger specific guidance if these words are guidance triggers for assigned guidance. These guidance triggers therefore, may be defined in terms of text, speech, or desktop actions. In still further embodiments, the guidance triggers are a combination content of the real-time interaction data with one or more discrete customer interaction events. In a non-limiting example, a guidance may be triggered by the customer asking about the "website" when the customer has also posed to the social media.

Once a guidance trigger is identified at 308, the assigned guidance is presented on the screen of the customer service agent's workstation at 310. The guidance presented may be exemplarily a reminder of steps or actions to be taken or a script or script portion to be read to the customer. In still further embodiments, the guidance may be to automatedly open the required application or form within the customer service agent's workstation, and/or to populate the application or form with any available and required customer information.

After the guidance has been presented at 310, at 312 an evaluation is made whether or not the customer service interaction is over at 312. It is possible that a single customer service interaction may have multiple issues or interaction types during the course of the customer service interaction, and the customer service agent may have multiple forms of guidance assigned to the customer service agent at a single time. As a non-limiting example, a customer may first call regarding a problem or a warranty regarding a product, and then proceed to discuss a new purchase or a change in service plans. Similarly, if it is determined that no guidance has been assigned at 306 for a particular interaction type identified at 304, if the interaction type changes or a new interaction type is identified, than that customer service agent may have guidance assigned for the newly identified interaction type.

At the end of the customer service interaction, the interaction content data is stored at 314 where the interaction content data may exemplarily be the audio data or a transcript of the communication between the customer service agent and the customer, and may also include a time stamped log of the actions taken by the customer service agent at the agent's workstation during the course of the customer service interaction. This interaction content data can then be used as previously described to identify emerging issues, comparatively review the agent's performance, and identify best practices and other data process analytics. One such action may be to evaluate the assigned guidance at 316. In evaluating the assigned guidance, it may be determined that the agent's customer service interactions now meet the performance standards for the interaction type, in this event, the assigned guidance may be removed. Alternatively, the agent's deviations from the performance standards may improve or change, which may result in a required change to the assigned automated guidance, perhaps to reflect improvement by the agent while the desired performance standard is still not met. Once changes are made to the assigned guidance, then the new assigned guidance will be used in subsequent repetitions of the method, with new customer service interactions.

Automated guidance can be targeted through guidance rules or triggers, or assignments to target the right guidance to the right agents in the right settings. Specifically assigned guidance and generally assigned guidance (includes guidance assigned to specific subgroups or agents) effectively target guidance to the agents that are in need of guidance. The automated guidance can be targeted to specific customers or customer concerns or topics by associating the guidance to specific interaction types or issues. Finally, the guidance must be automatedly provided to the agent at the appropriate time such that the agent may meaningfully act upon the guidance. Guidance triggers based on speech analytics, text analytics, or desktop analytics can ensure that the assigned guidance is timely provided.

Additional features of the disclosed systems and methods will be shown through a variety of non-limiting examples. In an embodiment that addresses the issue of new or unskilled customer service agents, agent score cards or evaluations can be used to identify agents with subpar performance, e.g. the bottom 10% of agents in sales. Desktop process analytics can be used to identify where in the customer service interactions those agents are deviating from performance standards. Speech analytics can be applied to specific customer service interactions to identify the optimum description or best practices based upon those customer service agents that have been identified as being the highest or best performers. In such an embodiment, the automated guidance of a pop-up alert with scripting derived from the best performers can be assigned to the bottom 10% of performing agents. This automated guidance can be triggered, for example, when it is detected that the customer has inquired about cost and the agent is on the order form screen. Additionally, automated process guidance can be triggered in order to populate the order form screen with the customer account and contact data from previous screens during the customer interaction. After the customer interaction is completed, the interaction can be analyzed in order to improve agent training and coaching modules based upon a speech analysis of the agent's calls. Cross-sales processes can be optimized based upon an analysis of the agent's desktop work flow. The automated guidance triggers can be refined to further improve metrics such as cross-sales based upon the speech analytics of the customer interactions.

In another example, an insurance company may want to improve customer service processes. In such an embodiment, speech or textual analytics may be used to identify the types of insurance claims where the customer service agents are most likely to deviate from predetermined scripts. Desktop process analytics can be used to identify any particular screens or applications where the customer service processes break down. In such an embodiment, automated guidance may be assigned to call customer service agents and the automated guidance is a pop-up alert that triggers when the agent arrives at the desktop screen or opens the application in question and advises all customer service agents of the correct next action. In an alternative, the automated guidance may be to automatically populate the screen or application with customer or service data. This guidance may be evaluated by reconfiguring processes based upon the results of the desktop process analytics of customer service interactions that include the assigned guidance. Scripting could be amended to streamline the customers' experience during a call based upon speech analytics of the customer service interactions.

In a further example, a customer service challenge is identified, exemplarily VIP customers having declining satisfaction scores after speaking with customer service agents. In such an example, customer feedback surveys may be used to identify which calls had low satisfaction scores. Text analytics may then be applied to the identified calls to understand or identify the cause of the lowered customer satisfaction. Speech analytics within one of the customer interactions can drill down into the identified call to identify points in the processes that caused dissatisfaction. In such an example, specific guidance may be assigned to all agents when it is identified that an agent is in a customer service interaction with one of the VIP customers. The automated guidance can be a pop-up alert that is triggered when a customer is identified as one of the targeted VIP customers with a prompt to offer such a customer with a specialized offer or promotion. Another form of guidance could include automated population of application screens in order to eliminate human error data entry or transcription mistakes. Further guidance could include an automated email alert sent to an account representative assigned to the VIP customer for follow up on the customer service interaction. After the call, customer service agent training or coaching modules can be improved based upon speech analytics of agent calls with VIP customers. Customer experience programs or process can be refined in order to offer specialized treatment to VIP customers based upon speech analytics of calls and customer follow up surveys. Additional materials for account recovery teams can be created based upon analysis of customer service interactions.

In a still further example, guidance can be created to help customer service agents with a competitive response, exemplarily to a new product, feature, promotion, or advertising of a key competitor. Desktop process analytics can be used to identify the frequency of customer service interactions that proceed to the "closed account" screen. Speech analytics can be used to identify why customers say that they are switching to a competitor. These analysis may identify that customers are switching to a particular competitor based upon a new product, feature, or marketing campaign of the competitor. Once such an emerging issue is identified, automated guidance may be assigned to all agents in order to address this new challenge. Examples of such automated guidance may include a pop-up alert that is triggered when a customer mentions the competitor in question and/or the agent proceeds to a close account screen. A pop-up alert may prompt the customer service agent to offer discounts or other promotions to the customer. Further automated guidance may include an email alert sent to other customer service or retention personnel in order to add the customer to discounts or promotions offered by those personnel or departments. After the customer service interaction, new sale and marketing materials can be created in order to counter the competitor's move after using the speech analytics to identify the customer preferences. A product development group can be provided with customer requested feature ideas and potential enhancement to products identified through speech analytics on the customer service interactions.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include, equivalent structural elements with insubstantial differences from the literal languages of the claims.

What is claimed is:

1. A computer-implemented method of automated personalized guidance, the method comprising:
    continuously monitoring by a computer processor interaction content data from an interaction between an agent and a customer;
    detecting, by the processor, at least one deviation from at least one predetermined performance standard for the agent in the monitored interaction content data;
    automatedly assigning, by the processor, at least one automated guidance to the agent based on the at least one deviation from the at least one predetermined performance standard, wherein assigning the at least one automated guidance to the agent causes the at least one automated guidance to be eligible for display to the agent to which it is assigned;
    determining, by the processor, at least one interaction type for the interaction content data based on analysis of the monitoring;
    detecting, by the processor, at least one guidance trigger based on the determined interaction type in the interaction content data;
    automatedly providing by the processor the at least one automated guidance to a graphical display for the agent when the automated guidance has been assigned to the agent and interaction type and the at least one guidance trigger matches requirements of the automated guidance;
    analyzing the monitored interaction content data with the processor to detect emerging topics and trends based on the analysis;
    automatedly creating, by the processor, at least one new performance standard from the detected emerging topics and trends, wherein the at least one new performance standard is added to the existing at least one predetermined performance standards; and
    continuing to monitor, by the processor, the interaction content data from the interaction to determine if the performance standards correct the detected deviation based on the guidance, wherein the performance standards include the at least one new performance standard; and
    removing the assignment of the guidance to the agent if the detected deviation is corrected.

2. The method of claim 1, wherein the monitoring of interaction content data is performed in real time.

3. The method of claim 2, wherein the interaction content data comprises streaming audio data.

4. The method of claim 2, further comprising:
    receiving interaction content data in real time;
    identifying an interaction type for the interaction content;
    based upon an interaction type, selecting a subset of guidance triggers; and
    identifying the guidance trigger in the interaction content, wherein the automated guidance is provided in a workstation upon the identification of the guidance trigger.

5. The method of claim 4, wherein the interaction content data comprises a textual transcript.

6. The method of claim 5, wherein the interaction content data comprises desktop analytic data.

7. The method of claim 5, wherein the automated guidance is a textual message presented on a graphical display.

8. The method of claim 4, wherein the automated guidance comprises automatedly opening an object in a workstation.

9. The method of claim 1, further comprising, removing the assigned automated guidance based upon the analysis of the assigned at least one automated guidance acquired from interactions in which the automated guidance was provided.

10. The method of claim 9, wherein the analysis of the assigned at least one automated guidance acquired from interactions in which the automated guidance was provided is a comparison of the interaction content data to the at least one predetermined performance standard.

11. A computer-implemented method of automated personalized guidance for customer service agents, the method comprising:
analyzing, by a computer processor, historical interaction content data acquired from customer service interactions of at least one customer service agent; wherein the historical interaction content data is data collected from at least one interaction between the at least one customer service agent and a first customer;
detecting, by the processor, emerging topics and trends from the analysis of the historical interaction content data;
automatedly creating, by the processor, at least one new predetermined performance standard from the detected emerging topics and trends, wherein the at least one new predetermined performance standard is added to the existing at least one predetermined performance standards;
assigning, by the processor, at least one automated guidance to the at least one customer service agent, wherein assigning the at least one automated guidance to the at least one customer service agent causes the at least one automated guidance to be eligible for display to each agent to which it is assigned;
continuously monitoring by the processor interaction content data from an interaction between the at least one agent and a second customer;
detecting by the processor at least one deviation from the at least one predetermined performance standard from the evaluated historical interaction content data;
determining by the processor at least one interaction type for the monitored interaction content data based on an analysis of the monitoring;
detecting by the processor at least one guidance trigger based on the determined interaction type in the monitored interaction content data;
upon identifying the at least one interaction type and at least one guidance trigger in the monitored interaction content data, automatically providing with the processor the associated guidance at a workstation of the customer service agent on a graphical display if the associated guidance has been assigned to the customer service agent; and
analyzing the assigned at least one guidance based upon the monitored interaction content data of the customer service interaction to determine if the deviation from the at least one predetermined performance standard is corrected.

12. The method of claim 11, wherein the interaction content data of a customer service interaction is monitored in real time.

13. The method of claim 12, wherein the interaction content data is streaming audio data or a textual transcript of the customer service interaction.

14. The method of claim 13, further comprising:
identifying an interaction type for the interaction content;
based upon an interaction type, selecting a subset of assigned guidance associated to the interaction type; and
identifying the guidance triggers of the subset of assigned guidance in the interaction content.

15. The method of claim 14, wherein the automated guidance is a textual message presented on a graphical display.

16. The method of claim 14, wherein the automated guidance comprises automatedly opening an object in a workstation.

17. The method of claim 11, further comprising, removing the assigned guidance based upon the analysis of the assigned at least one automated guidance acquired from interactions.

18. A system for automated guidance for an agent, the system comprising:
a computer readable medium upon which interaction content data is stored, wherein the interaction content data is data collected from an interaction between an agent and a customer;
a computer readable medium upon which emerging topics and trends are detected from the analysis of the interaction content data, at least one new performance standard is automatically created from the detected emerging topics and trends to be added to the existing at least one predetermined performance standards;
a computer readable medium upon which a plurality of guidance is stored, each guidance being associated to a performance standard and an interaction type, and each guidance further being defined by at least one guidance trigger;
computer readable medium upon which a plurality of the performance standards are stored, a plurality of the interaction types are stored, and a plurality of the guidance triggers are stored;
a processor communicatively connected the computer readable media upon which the interaction content data, guidance, interaction types, guidance triggers, and performance standards are stored, the processor:
monitors interaction content data from an interaction between an agent and a customer,
detects at least one deviation from at least one predetermined performance standard for the agent in the monitored interaction content data,
assigns at least one automated guidance to the agent based on the at least one deviation from the at least one predetermined performance standard, wherein assigning the at least one automated guidance to the agent causes the at least one automated guidance to be eligible for display to the agent to which it is assigned,
determines at least one interaction type for the interaction content data based on analysis of the monitoring,
detects at least one guidance trigger based on the determined interaction type in the interaction content data,
automatically provides the at least one automated guidance to the agent when the automated guidance has been assigned to the agent and interaction type and the at least one guidance trigger matches requirements of the automated guidance, continues to monitor the interaction content data from the interaction to determine if the performance standards correct the detected deviation based on the guidance, wherein the performance standards include at least one new performance standard, removes the assignment of the guidance to the agent if the detected deviation is corrected; and at least one computer workstation comprising a graphical display, the graphical display operated by the processor to automatedly present the guidance to the agent.

* * * * *